Oct. 19, 1954 A. B. RUDENAUER 2,692,141

CONSTANT LINEAR SPEED PHONOGRAPHIC APPARATUS

Filed May 3, 1952 3 Sheets-Sheet 1

INVENTOR.
ARTHUR B. RUDENAUER
BY Sanford Schnurmacher
ATTORNEY

CONSTANT LINEAR SPEED PHONOGRAPHIC APPARATUS

Filed May 3, 1952 3 Sheets-Sheet 2

INVENTOR.
ARTHUR B. RUDENAUER
BY Sanford Schnurmacher
ATTORNEY

CONSTANT LINEAR SPEED PHONOGRAPHIC APPARATUS

Filed May 3, 1952

3 Sheets-Sheet 3

INVENTOR.
ARTHUR B. RUDENAUER
BY Sanford Schnurmacher
ATTORNEY

Patented Oct. 19, 1954 2,692,141

UNITED STATES PATENT OFFICE 2,692,141

CONSTANT LINEAR SPEED PHONOGRAPHIC APPARATUS

Arthur B. Rudenauer, Cleveland, Ohio

Application May 3, 1952, Serial No. 285,995

4 Claims. (Cl. 274—9)

This invention relates to phonograph recording and reproducing devices and particularly to means for co-ordinating turntable speed with stylus feed.

Conducive to a better understanding of this invention, it may be well to point out that in the recording and reproduction of sound by mechanical or electrical means the fidelity of the reproduced sound is dependent upon the rate of travel of the recording medium with relation to the recording head or stylus. For example, it has been found that surface speeds as high as 15″ per second are required to furnish a frequency range of from 50 to 15,000 cycles per second which is necessary for the faithful reproduction of music. However, acceptable recordings of speech may be had at speeds as low as 2″ per second in machines used for office dictation work. In the case of records in the form of flat disks wherein the recording medium takes the form of a spiral path or groove which becomes progressively smaller in diameter as the center of rotation is approached, the problem of surface speed presents a compromise between recording time and sound quality. Having determined the surface speed required for the desired quality of reproduction, the record turntable must be made to provide that speed at the point of minimum diameter of the spiral groove or path followed by the stylus as it travels between the outer edge of the record toward the center. With the turntable set to provide the proper surface speed at the minimum track diameter, the surface speed at the point of maximum track diameter is left to fall where it will.

To cite an extreme example, let us assume we have a 16″ record having 500 lines to the inch extending from the edge of the record to a center point at which the line spiral is two inches in diameter. Let us further assume that in recording speech a surface speed of 2″ per second will provide satisfactory voice quality for the purpose intended. In order to provide this surface speed at the point of 2″ spiral diameter the record must rotate at 20 R. P. M. When rotating at 20 R. P. M., a 16″ record will have a surface speed of 16⅔″ per second at its peripheral edge. Thus the surface speed will be approximately eight times greater than necessary, which means that eight times less material is being recorded than is theoretically possible in the elapsed time when the stylus point is at the outer edge of the 16″ record. Under these circumstances, a 16″ disk will hold a little less than three hours of recorded speech. However, if the surface speed of the record beneath the stylus point were to be maintained at a constant 2″ per second rate, the same diameter record could retain a little more than five hours of speech. Thus the same record would have its capacity increased by two-thirds, if the recording were made at a constant surface speed.

The primary object of this invention, therefore, is to provide a mechanism for recording on phonograph disks that will hold the recording groove or spiral path to a constant surface speed at all times.

A further object is to provide a recording mechanism that will record approximately two-thirds more material on a record of given diameter, and number of lines per inch, than is possible with conventional disk recording machines.

Still another object is to provide a machine that will record with equal facility on records of the grooved, embossed or magnetic type.

Other objects are to provide a device that is rugged in structure, compact in size and economical to manufacture.

These and other objects of the invention will become apparent from a reading of the following specification and claims, together with the accompanying drawings, wherein:

Figure 1:
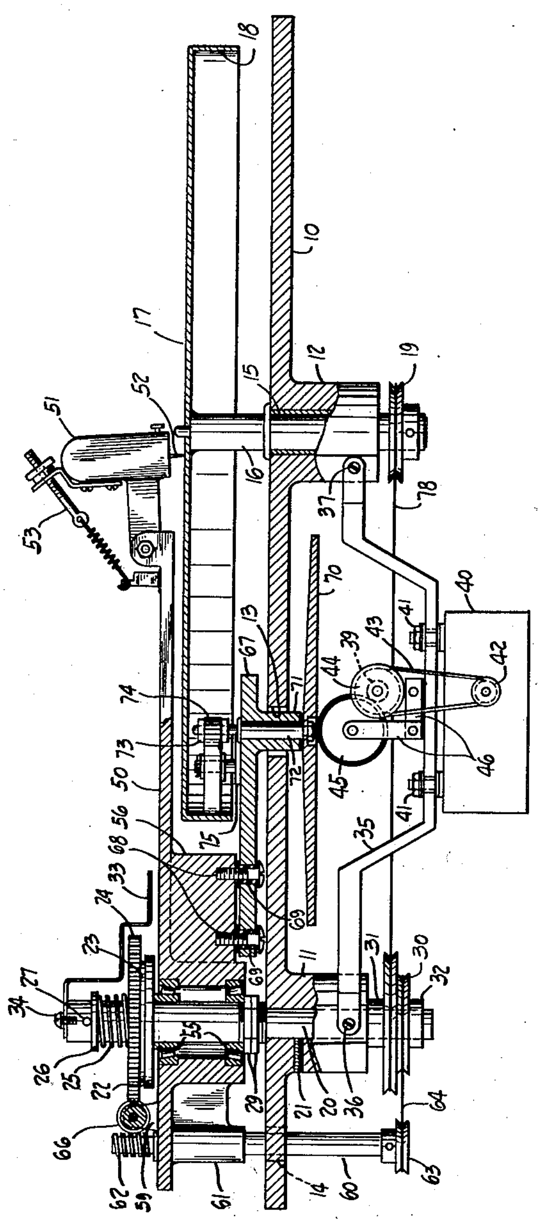
Figure 1 is a vertical sectional view of the constant surface speed disk recorder constituting this invention.

Referring to the drawings, there is seen the recording arm and constant surface-speed turntable mechanism that is the subject of this invention.

Reference numeral 10 indicates a rigid cast metal base of general rectangular configuration. The base has two bosses 11 and 12 cast integral therewith, although it is to be understood that they could take the form of separate members firmly affixed thereto by welding or bolting. The boss 12 has a vertical hole therethru in which a bearing sleeve 15 is seated. The turntable 17 is rigidly keyed to the spindle 16 which is journaled in the bearing 15. The turntable 17 may be of any desired diameter. For use in a compact office desk dictating machine the turntable may be approximately 6″ in diameter, while if intended for professional performance it may be as large as 16″ in diameter. The turntable 17 has a dependent peripheral flange 18 and is covered with an anti-slip covering of felt or rubber so that a record disk placed thereon will retain its position.

A pulley 19 is rigidly secured to the lower end of the spindle 16, below the base.

Figure 4:
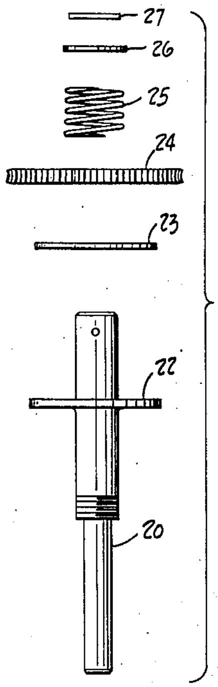
Figure 4 is an enlarged exploded view of the recorder arm clutch assembly.
Figure 3:
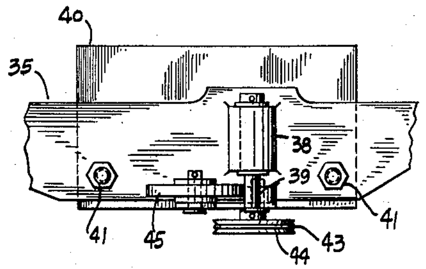
Figure 3 is a top plan view of a portion of the motor suspension frame and the speed-ratio disk drive.

A clutch assembly upon which the hereinafter described recorder arm 50 is rotatably supported is anchored in the boss 11 as shown in the Figure 1. The clutch assembly is made up of a shaft or post 20 which is seated in a vertical bore in the boss 11 and locked against rotation by means of a set screw 21. The clutch assembly is the same as that illustrated and described in the United States Patent No. 2,549,390, issued to me on April 17, 1951, entitled "Phonograph Record Cutting Mechanism." The shaft 20 has a flange or seat 21 formed integral therewith. A friction disk 23 made of rubber or fiber is seated on the flange 21. A first worm gear 24 is journaled on the shaft 20 above the friction disk 23, the gear 24 being free to rest against the upper face of the friction disk. The worm gear 24 and the friction disk 23 are pressed against one another and the seat 21 by the clutch spring 25 which is in turn compressed by means of the washer 26 and the locking pin 27 which is seated in a transverse hole in the top end of the shaft 20 as shown in the Figures 1 and 4. A free revolving double pulley 30 is journaled on the lower end of the fixed shaft 20, spaced from the boss 11 by the collar 31 and supported by the locked collar 32.

A recording arm 50 is mounted on the shaft 20 on tapered roller bearings 55 which are secured by lock nuts 29.

Figure 2:
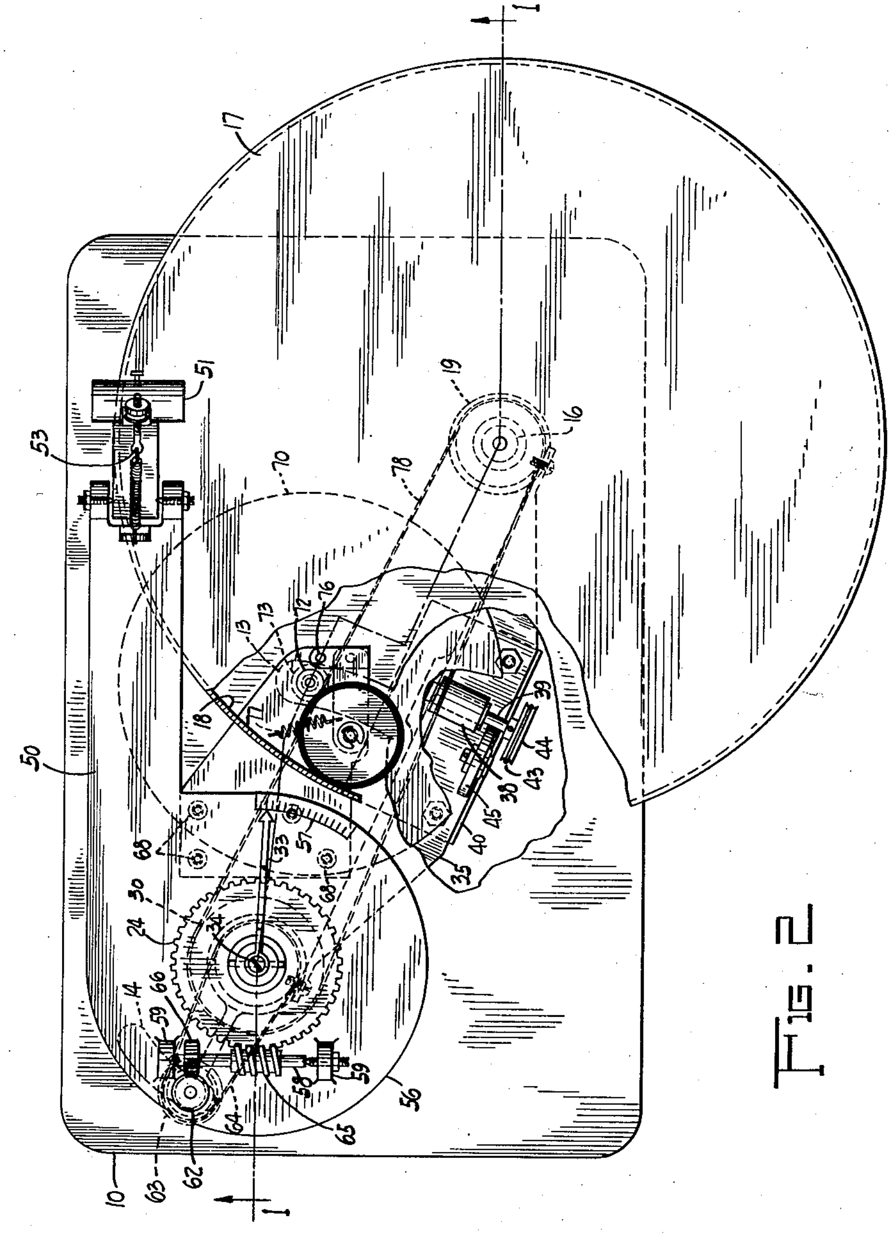
Figure 2 is a top plan view of the same with portions broken away to show the relative position of the underlying mechanism.

A stylus 52 is mounted at the free end of the arm in a recording of reproducing head 51 as shown in the Figures 1 and 2. The head 51 is of the conventional type having stylus pressure adjusting means 53. The other end of the arm has a circular bracket portion 56 on which is mounted a pair of spaced bearings 59 which support the counter shaft 58.

A vertically extending drive shaft 60 is journaled in the bearing 61. The shaft 60 extends through a slot 14 in the base 10. A pulley 63 is secured to the lower end of the shaft in alignment with the pulley 30.

A first worm 62 is secured to the upper end of the shaft 60. The worm 62 is meshed with a second worm gear 66 on the counter shaft 58 which has a second worm 65 which is in turn meshed with the first worm gear 24. The pulley 63 is connected to the pulley 30 through the endless belt 64. The pulley 30 is in turn connected to the pulley 19 through the endless belt 78.

Figure 5:
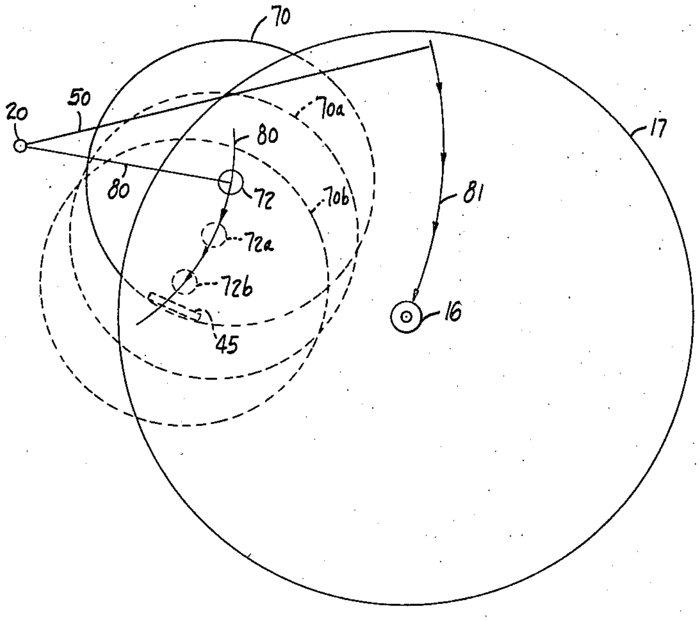
Figure 5 is a schematic graph showing the relation of the travel paths of the constant surface speed control elements.

A plate 67 is attached to the bracket 56 by means of bolts 68 through anti-vibration grommets 69. The plate 67 is positioned below the turntable 17 and parallel thereto. Reference numeral 71 indicates a bearing boss formed integral with the plate 67 and extending through a slot 13 in the base 10. A disk 70 is mounted on the shaft 72 which is journaled in the bearing 71. A drive pinion 73 is fixed to the upper end of the shaft 72. A rubber-tired idler wheel 74 is mounted on bracket arms 75 which are pivoted on the pin 76. The idler 74 is positioned between the pinion 73 and the turntable rim 18 and is held in contact with both by the action of the spring 77. The diameter of the disk 70 is exactly one-half the diameter of the turntable 17. The center of rotation of the disk shaft 72 is located at a point with reference to the center of the clutch shaft 20 that is one-half the distance from the center of the shaft 20 to the point of the stylus 52 as shown in the Figure 5.

Reference numeral 40 indicates a high speed motor which is mounted by means of bolts 41 on a frame 35 that is supported between the bosses 11 and 12 by means of bolts 36 and 37 respectively. A motor countershaft 39 positioned parallel to the underside of the disk 70 is journaled in the bearing 38. A pulley 44 at the end of the counter-shaft 39 is coupled to the motor pulley 42 through an endless belt 43. A rubber-tired speed-ratio idler pulley 45 having its axis of rotation parallel to the counter-shaft 39 and the underface of the disk 70 is mounted on the pivoted bracket 46. The pulley 45 is in spring pressed contact with the disk 70 and the shaft 39. The disk 70 is rotated by the motor 40 through the speed-ratio idler pulley 45. The turntable 17 is in turn driven by the disk 70 through the idler pulley 74 which bears against the turntable rim 18.

The shaft 60 is rotated by the turntable 17 acting through the spindle 16, pulley 19, belt 78, pulley 30, belt 64 and pulley 63. The rotation of the worm 62 meshed with the counter shaft worm gear 66 causes the second worm 65 to rotate about the fixed worm gear 24, thereby causing the arm 50 to rotate on the shaft 20. The diameter and tooth pitch of the various pulleys and gears is calculated to co-operatively produce the desired stylus-point rate of travel radially of the turntable for each revolution of the turntable. As the arm 50 moves across the turntable 17, the disk 70 moves with it in an arc identified by reference numeral 80 in the Figure 5. As this occurs, the disk 70 moves to the alternate positions 70*a* and 70*b* with reference to the speed-ratio pulley 45. This progressively changes the gear ratio between the disk 70 and the pulley 45 to increase the speed of the disk and turntable 17 as the center of rotation 72 of the disk approaches the speed-ratio pulley 45. Thus the surface speed of the turntable relative to the stylus point 52 remains constant as the stylus point and arm travel from the outside edge of the turntable 17 toward the spindle 16 in the arc identified by reference numeral 81.

The belt linkage between pulleys 63 and 30 permits the arm drive shaft 60 to rotate in the slot 14 around the stationary post 20, thereby carrying the arm 50 with it. The arm 50 may be moved manually to any point by exerting a rotary force upon it great enough to overcome the pressure of the spring 25, which causes the worm gear 24 to slip relative the friction disk 23 as explained in my above identified Patent No. 2,549,390. The position of any portion of a recorded message can be located on a supported record by referring to the scale 57 on the arm 50 and pointer 33 which is secured to the stationary post 20 by means of the screw 34.

When the type of recording known as embossing is used, it is easily possible to employ 500 recording lines to the inch. When voice recording on a 16″ record is to be undertaken at a surface-speed of 2″ per second the machine is geared to rotate the turntable at 2.4 revolutions per minute when the stylus point is at the outside edge of the record. As the arm moves toward the turntable spindle the progressive movement of the disk 70 carried by the arm plate 67 along the arc 80 causes the pulley 45 to drive the disk 70 progressively faster, thereby progressively increasing the speed of the turntable 17 as the circumference of the spiral covered by the stylus point 52 becomes progressively smaller. By the time the recording spiral has become 2'' in diameter at the center of the record, the turntable speed will have changed from 2.4 R. P. M. to 20 R. P. M. Thus at a 2'' diameter of rotation with a circumference of approximately 6 inches the surface-speed at 20 R. P. M. is still 2'' per second. Since the arm 50 is positively driven from the turntable pulley 19, this device may be used to record and reproduce sound on records having no definite tracking grooves such as paper and plastic magnetic and embossed records. Furthermore it is quite simple to provide a reversing set of pulleys and clutch on the lower end of the shaft 20 so that the arm 50 may be made to move from the center of the turntable outward toward the edge. This is sometimes useful when paper records are being used, since there is less tendency to wrinkle the paper record if the movement of the stylus is directed away from the center of the record instead of toward the center.

By reason of the method of arm suspension on a slip clutch, the stylus point may be easily moved to any point on the record without requiring the time consuming wait required by mechanical movement.

Due to the constant surface speed provided by this device, 66% more material can be recorded per radial inch of record than is possible with machines providing a constant number of revolutions per minute. This is especially important when small records are being used as is the case with business correspondence wherein recorded reports are mailed between salesmen and the home office.

While the illustration used involved a record surface speed of 2'' per second with reference to the stylus point, it should be understood that the same principles apply and proportionate increases in recorded material are obtained when using records at speeds and diameters other than those used in describing the operation of the invention.

It will now be clear that there has been provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A constant surface speed turntable drive for a phonograph of the type having a circular turntable and a recorder arm having a recording head including a stylus moveable radially of a record supported on the said turntable in a line passing through the center thereof, comprising a bracket formed integral with the arm and moveable therewith, having a plate portion positioned below the plane of the turntable, the said plate having a vertical bearing block mounted thereon, a vertically extending shaft journaled in said bearing, the shaft having a disk mounted on the lower end thereof rotatable in a horizontal plane below the plate and a pinion mounted on the upper end thereof, the said pinion being frictionally engaged through a spring pressed idler wheel mounted on the top of the plate with the rim of the turntable in all possible positions of the said shaft; recorder arm driving means; a high speed driving means; and a speed-ratio pulley adapted to be driven by said driving means, the axis of rotation of the pulley being perpendicular to the axis of rotation of the disk, the peripheral edge of the pulley being in contact with the surface of said disk in all possible positions of the disk, the disk being moveable with the arm in an arc relative to said pulley, wherein the point of contact between the disk and pulley is changeable between positions lying between the periphery and the center of the disk to continuously and progressively change the speed ratio between the pulley and disk as the recorder arm and supported stylus point move from the periphery of the turntable toward the center thereof, whereby the surface speed of the turntable is maintained constant with reference to the stylus point.

2. A constant surface speed turntable drive for a phonograph of the type having a circular turntable and a recorder arm having a recording head including a stylus moveable radially of a record supported on the said turntable in a line passing through the center thereof, comprising a bracket formed integral with the arm and moveable therewith having a plate portion positioned below the plane of the turntable, the said plate having a vertical bearing block mounted thereon; a vertically extending shaft journaled in said bearing, the center of rotation of said shaft being positioned at a point whose distance from the center of rotation of the recorder arm is equal to one-half the radius of the arc inscribed by the stylus tip, the shaft having a disk mounted on the lower end thereof rotatable in a horizontal plane below the plate and a pinion mounted on the upper end thereof, the said pinion being frictionally engaged through a spring pressed idler wheel, mounted on the top of the plate, with the rim of the turntable in all possible positions of the said shaft; the diameter of said disk being one-half the diameter of the turntable; recorder arm driving means; a high speed driving means; and a speed-ratio pulley adapted to be driven by said driving means, the axis of rotation of the pulley being perpendicular to the axis of rotation of the disk, the peripheral edge of the pulley being in contact with the surface of said disk in all possible position of the disk, the disk being moveable with the arm in an arc relative to said pulley, wherein the point of contact between the disk and pulley is changeable between positions lying between the periphery and the center of the disk to continuously and progressively change the speed ratio between the pulley and disk as the recorder arm and supported stylus point move from the periphery of the turntable toward the center thereof, whereby the surface speed of the turntable is maintained constant with reference to the stylus point.

3. A constant surface speed turntable drive for a phonograph of the type having a circular turntable and a recorder arm having a recording head including a stylus moveable radially of a record supported on the said turntable in a line passing through the center thereof, comprising a bracket formed integral with the arm and moveable therewith, having a plate portion positioned below the plane of the turntable, the said plate having a vertical bearing block mounted thereon; a vertically extending shaft journaled in said bearing, the center of rotation of said shaft being positioned at a point whose distance from the center of rotation of the recorder arm is equal to one-half the radius of the arc inscribed by the stylus tip, the shaft having a disk mounted on the lower end thereof rotatable in a horizontal plane below the plate and a pinion mounted on the upper end thereof, the said pinion being frictionally engaged through a spring pressed idler wheel, mounted on the top of the plate, with the rim of the turntable in all possible positions of the said shaft; the diameter of said disk being one-half the diameter of the turntable; recorder arm driving means directly coupling the turntable spindle with the recorder arm; an electric motor including a counter shaft spaced from said disk and parallel to the lower face thereof, and a speed-ratio pulley mounted on a pivoted axis parallel to said counter shaft and perpendicular to the axis of rotation of the disk shaft, the peripheral edge of the pulley being in spring loaded contact with the counter shaft and disk in all possible positions of the disk, the disk being moveable with the arm in an arc relative to said pulley, wherein the point of contact between the disk and pulley is changeable between positions lying between the periphery and the center of the disk to continuously and progressively change the speed ratio between the pulley and disk as the recorder arm and supported stylus point move from the periphery of the turntable toward the center thereof, whereby the surface speed of the turntable is maintained constant with reference to the stylus point.

4. A constant surface speed turntable drive for a phonograph of the type having a turntable and a recorder arm having a recording head including a stylus moveable radially of a record supported on the turntable in a line passing through the center thereof, comprising in combination, a rectangular frame member having a dependent journal block, a recording arm post spaced therefrom a distance equal to the radius of curvature of the arc inscribed by the stylus tip, and an arcuate slot centered between the block and post, the radius of curvature of the slot being centered on the post and being equal to one-half that of the arc inscribed by the aforesaid stylus tip; a turntable journaled in said block above the frame: a recording arm rotatably mounted on the post above the frame and extending over the turntable; the arm having a bracket, including a plate portion extending over the said slot, the plate having a dependent bearing block mounted thereon extending through the said slot, the center of the bearing block being positioned on the center-line of the slot; a vertically extending shaft journaled in said bearing and having a disk mounted on the lower end thereof rotatable in a horizontal plane below the plate and frame, and a pinion mounted on the upper end thereof, the pinion being frictionally engaged through a spring pressed idler wheel, mounted on the top of the plate, with the rim of the turntable in all possible positions of the shaft; the diameter of the disk being one-half the diameter of the turntable; recorder arm driving means; an electric motor including a counter-shaft, mounted on the underside of the frame, spaced from said disk and parallel to the lower face thereof, and a speed-ratio pulley mounted on a pivoted axis parallel to said counter-shaft and perpendicular to the axis of rotation of the disk shaft, the peripheral edge of the pulley being in spring loaded contact with the counter-shaft and disk in all possible positions of the disk, the disk being moveable with the arm in an arc relative to the pulley, wherein the point of contact between the disk and pulley is changeable between positions lying between the periphery and the center of the disk to continuously and progressively change the speed ratio between the pulley and disk as the recorder arm and supported stylus move from the periphery of the turntable toward the center thereof.

References Cited in the file of this patent

UNITED STATES PATENTS

| Number | Name | Date |
|---|---|---|
| 1,769,954 | James | July 8, 1930 |
| 2,035,287 | Lahr | Mar. 24, 1936 |